United States Patent
Quong (10) Patent No.: US 8,838,882 B1
(45) Date of Patent: Sep. 16, 2014

(54) MULTI-LEVEL PROMOTION CACHING

(75) Inventor: Russell Quong, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 141 days.

(21) Appl. No.: 13/424,002

(22) Filed: Mar. 19, 2012

(51) Int. Cl.
*G06F 12/00* (2006.01)

(52) U.S. Cl.
USPC ............................ 711/103; 711/154; 711/167

(58) Field of Classification Search
USPC ......................................... 711/103, 154, 167
See application file for complete search history.

(56) References Cited

U.S. PATENT DOCUMENTS

| | | | | |
|---|---|---|---|---|
| 4,374,409 A | * | 2/1983 | Bienvenu et al. | 718/106 |
| 5,341,491 A | * | 8/1994 | Ramanujan | 711/152 |
| 6,324,625 B1 | * | 11/2001 | Singer et al. | 711/154 |
| 6,430,593 B1 | * | 8/2002 | Lindsley | 718/103 |
| 2002/0101820 A1 | * | 8/2002 | Gupta et al. | 370/229 |
| 2002/0116568 A1 | * | 8/2002 | Oksanen | 711/101 |
| 2002/0138854 A1 | * | 9/2002 | Desai et al. | 725/147 |
| 2005/0240745 A1 | * | 10/2005 | Iyer et al. | 711/167 |
| 2008/0209494 A1 | * | 8/2008 | Dravida et al. | 725/129 |
| 2013/0073787 A1 | * | 3/2013 | Post et al. | 711/103 |

\* cited by examiner

*Primary Examiner* — Mardochee Chery
(74) *Attorney, Agent, or Firm* — Honigman Miller Schwartz and Cohn LLP (57) ABSTRACT

A computer-implemented method that includes arranging blocks of memory of a non-volatile computer-readable medium in queues. Each queue has a promotion level, a head, a tail, a leading portion of memory blocks starting at the head of the queue and a trailing portion of memory blocks ending at the tail of the queue. Each queue receives data into a memory block associated with the head of the queue. Moreover, the memory blocks rotate from the head of the queue to the tail of the queue in successive order upon receiving data with first-in-first-out (FIFO) data eviction (e.g., the memory blocks rotate through FIFO queues). The method also includes copying data accessed in a trailing portion of a first queue into a memory block associated with the head of a second queue having a promotion level greater than a promotion level of the first queue.

30 Claims, 5 Drawing Sheets

MULTI-LEVEL PROMOTION CACHING

TECHNICAL FIELD

This disclosure relates to methods of accessing and storing data in non-volatile computer-readable mediums.

BACKGROUND

In general, flash memory is a non-volatile computer storage chip that can be electrically programmed, erased and reprogrammed iteratively a finite number of times. Usually, one or more blocks of flash memory must be erased before they can be rewritten with new data and the number of times to erase or program the flash memory is limited.

Usually, flash memory can be erased in blocks instead of one byte at a time. Each erasable block of memory may include non-volatile memory cells arranged in rows and columns. Each cell is coupled to a word line, a bit line and a source line. In particular, a word line is coupled to a control gate of each cell in a row, a bit line is coupled to a drain of each cell in a column and the source line is coupled to a source of each cell in an erasable block. The cells are programmed and erased by manipulating the voltages on the word lines, bit lines and source lines.

NAND type flash memory can be found in memory cards, flash drives, solid-state drives, and similar products, for general storage and transfer of data. NOR type flash memory, which allows true random access and therefore direct code execution, is typically used as a replacement for older electrically erasable programmable read-only memory (EPROM) and as an alternative to certain kinds of read only memory (ROM) applications.

Example applications of both types of flash memory include servers, personal computers, portable electronic devices, scientific instrumentation, robotics, medical electronics, and so on.

SUMMARY

Using a non-volatile computer-readable medium, such flash memory, for storing data may allow for relatively lower hardware storage costs as well as relatively faster access times compared to using conventional hard disk drives. Data writing restrictions for flash memory, however, generally include erasing relatively large blocks of memory before receiving any new data into even a portion of those respective memory blocks. When using flash memory as a cache for storing recently accessed data from a storage system, a data eviction policy can be implemented for determining when and what data is erased to free up memory for receiving additional data.

One aspect of the disclosure provides a computer-implemented method that includes arranging blocks of memory of a non-volatile computer-readable medium in queues. Each queue has a promotion level, a head, a tail, a leading portion of memory blocks starting at the head of the queue and a trailing portion of memory blocks ending at the tail of the queue. Each queue receives data into a memory block associated with the head of the queue. Moreover, the memory blocks rotate from the head of the queue to the tail of the queue in successive order upon receiving data with first-in-first-out (FIFO) data eviction (e.g., the memory blocks rotate through FIFO queues). The method also includes copying data accessed or selected in a trailing portion of a first queue into a memory block associated with the head of a second queue having a promotion level greater than a promotion level of the first queue. In some examples, the method includes selecting some data (e.g., a portion or subset of any data accessed in the trailing portion of the first queue) for copying into the memory block associated with the head of the second queue.

Implementations of the disclosure may include one or more of the following features. The disclosure provides implementations with respect to memory blocks within non-volatile flash memory. The methods described herein may be extended to other types of non-volatile memory as well. In some implementations, the method includes copying data accessed or selected in the trailing portion of a queue having a top promotion level into a memory block associated with the head of that queue. The method may include assessing an access frequency (or selection frequency) of data stored in a memory block at the tail of a queue having the top promotion level and copying data having a threshold access frequency from the memory block at the tail of the queue to a memory block at the head of that queue. Assessing an access frequency may include counting a number of data reads within a threshold period of time and/or determining a period of time between data reads. In some examples, the number of queues can be altered based on queue usage. For example, queues unused or infrequently used in upper promotion levels can be resized (e.g., decreased in size) or terminated, where removed memory blocks are reallocated to queues of lower promotion levels. Likewise, memory blocks can be rearranged to create additional queues as needed. The method may include rearranging memory blocks (e.g., dynamically) among the queues, altering sizes of the queues, based on respective queue usage.

In some implementations, the method includes arranging the blocks of memory into first, second, and third queues. The first queue has a corresponding first promotion level, the second queue has a corresponding second promotion level greater than the first promotion level, and the third queue has a corresponding third promotion level greater than the second promotion level. The method further includes copying data accessed or selected in a trailing portion of the first queue into a memory block associated with the head of the second queue, and copying data accessed in a trailing portion of the second queue into a memory block associated with the head of the third queue. The first queue may be sized larger than the second queue and the second queue may be sized larger than the third queue. In some examples, the method includes copying data accessed or selected in a trailing portion of the third queue into a memory block associated with the head of the third queue.

Another aspect of the disclosure provides a computer-readable medium that stores instructions executable by one or more computing processors to perform a method for managing a non-volatile computer-readable medium. The method includes arranging blocks of memory of a non-volatile computer-readable medium in queues. Each queue has a promotion level, a head, a tail, a leading portion of memory blocks starting at the head of the queue and a trailing portion of memory blocks ending at the tail of the queue. Each queue receives data into a memory block associated with the head of the queue. Moreover, the memory blocks rotate from the head of the queue to the tail of the queue in successive order upon receiving data with first-in-first-out (FIFO) data eviction (e.g., the memory blocks rotate through FIFO queues). The method also includes copying data accessed or selected in a trailing portion of a first queue into a memory block associated with the head of a second queue having a promotion level greater than a promotion level of the first queue.

In some implementations, the method includes copying data accessed or selected in the trailing portion of a queue having a top promotion level into a memory block associated with the head of that queue. The method may include assessing an access frequency of data stored in a memory block at the tail of a queue having the top promotion level and copying data having a threshold access frequency from the memory block at the tail of the queue to a memory block at the head of that queue. Assessing an access frequency may include counting a number of data reads within a threshold period of time and/or determining a period of time between data reads. In some examples, the number of queues can be altered based on queue usage. For example, queues unused or infrequently used in upper promotion levels can be resized (e.g., decreased in size) or terminated, where removed memory blocks are reallocated to queues of lower promotion levels. Likewise, memory blocks can be rearranged to create additional queues as needed. The method may include rearranging memory blocks (e.g., dynamically) among the queues, altering sizes of the queues, based on respective queue usage.

In some implementations, the method includes arranging the blocks of memory into first, second, and third queues. The first queue has a corresponding first promotion level, the second queue has a corresponding second promotion level greater than the first promotion level, and the third queue has a corresponding third promotion level greater than the second promotion level. The method further includes copying data accessed or selected in a trailing portion of the first queue into a memory block associated with the head of the second queue, and copying data accessed or selected in a trailing portion of the second queue into a memory block associated with the head of the third queue. The first queue may be sized larger than the second queue and the second queue may be sized larger than the third queue. In some examples, the method includes copying data accessed or selected in a trailing portion of the third queue into a memory block associated with the head of the third queue.

The disclosure also provides, in yet another aspect, a non-volatile computer-readable medium that stores instructions executable by one or more computing processors. The non-volatile computer-readable medium includes blocks of memory arranged in queues having associated promotion levels. Each queue has a promotion level, a head, a tail, a leading portion of memory blocks starting at the head of the queue and a trailing portion of memory blocks ending at the tail of the queue. Each queue receives data into a memory block associated with the head of the queue. The memory blocks rotate from the head of the queue to the tail of the queue in successive order upon receiving data with first-in-first-out data eviction (e.g., FIFO queues). Data accessed or selected in a trailing portion of a first queue is copied into a memory block associated with the head of a second queue having a promotion level greater than a promotion level of the first queue.

In some implementations, data accessed or selected in the trailing portion of a queue having a top promotion level is copied into a memory block associated with the head of that queue. Moreover, data having a threshold access frequency and being in a memory block at the tail of a queue having the top promotion level can be copied from that tail memory block to a memory block at the head of that queue. The access frequency may include a number of data reads within a threshold period of time and/or a period of time between data reads. In some examples, the number of arranged queues is based on queue usage. The memory blocks may be rearranged among the queues, altering sizes of the queues, based on respective queue usage.

The blocks of memory may be arranged into first, second, and third queues. The first queue has a corresponding first promotion level, the second queue has a corresponding second promotion level greater than the first promotion level, and the third queue has a corresponding third promotion level greater than the second promotion level. Data accessed or selected in a trailing portion of the first queue is copied into a memory block associated with the head of the second queue, and data accessed or selected in a trailing portion of the second queue is copied into a memory block associated with the head of the third queue. In some examples, the first queue is larger than the second queue and the second queue is larger than the third queue. Data accessed in a trailing portion of the third queue may be copied into a memory block associated with the head of the third queue.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
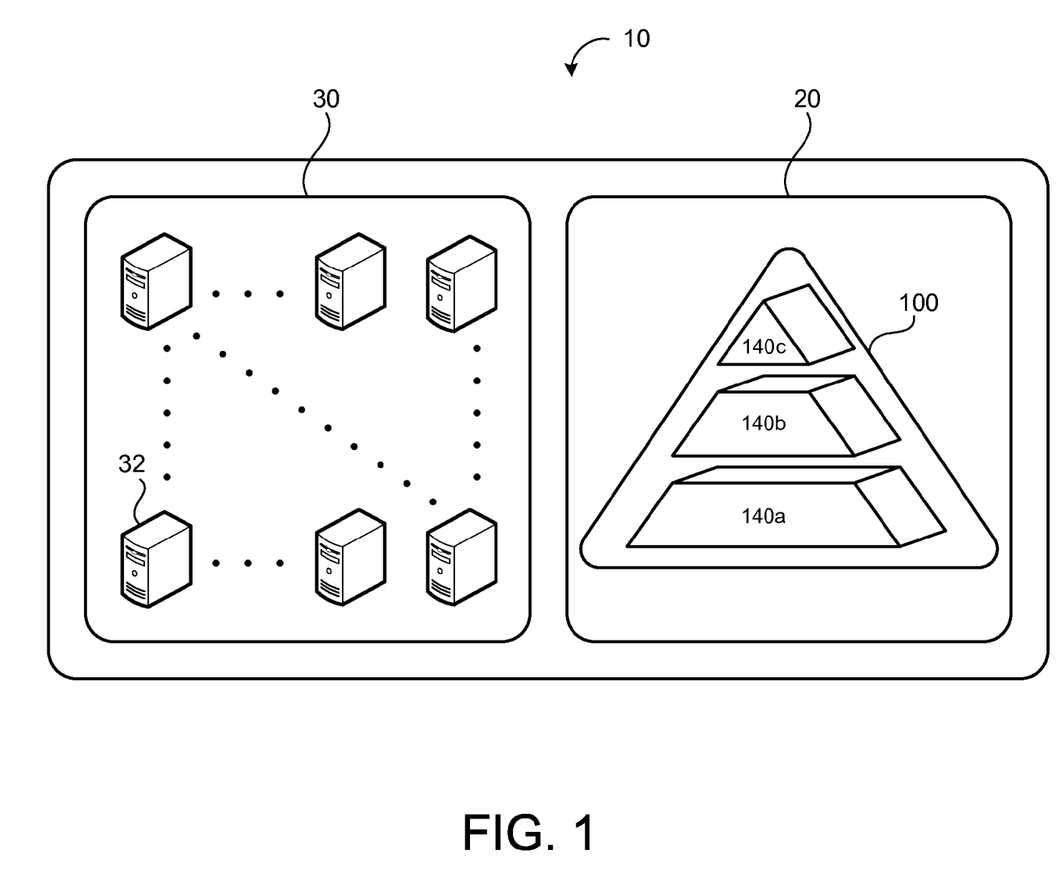
FIG. 1 is a schematic view an exemplary data storage system.

Referring to FIG. 1, a data storage system 10 may include a non-volatile computer-readable medium 100 (e.g., flash memory) as a cache 20 for storing frequently accessed data. The non-volatile computer-readable medium 100 may offer relatively lower hardware storage costs as well as relatively faster access times compared to using conventional hard disk drives for the cache 20. In the example shown, the data storage system 10 includes a cache 20 in communication with a bank 30 of disk drives 32. The data storage system 10 may write or store data accessed from the bank 30 of disk drives 32 in the cache 20 to facilitate a relatively quicker retrieval or access time of that data from the cache 20, as compared to accessing that data from the disk drive bank 30 again. The cache 20, having a finite size, may eventually evict previously received data to allow the receipt of additional data.

Figure 2:
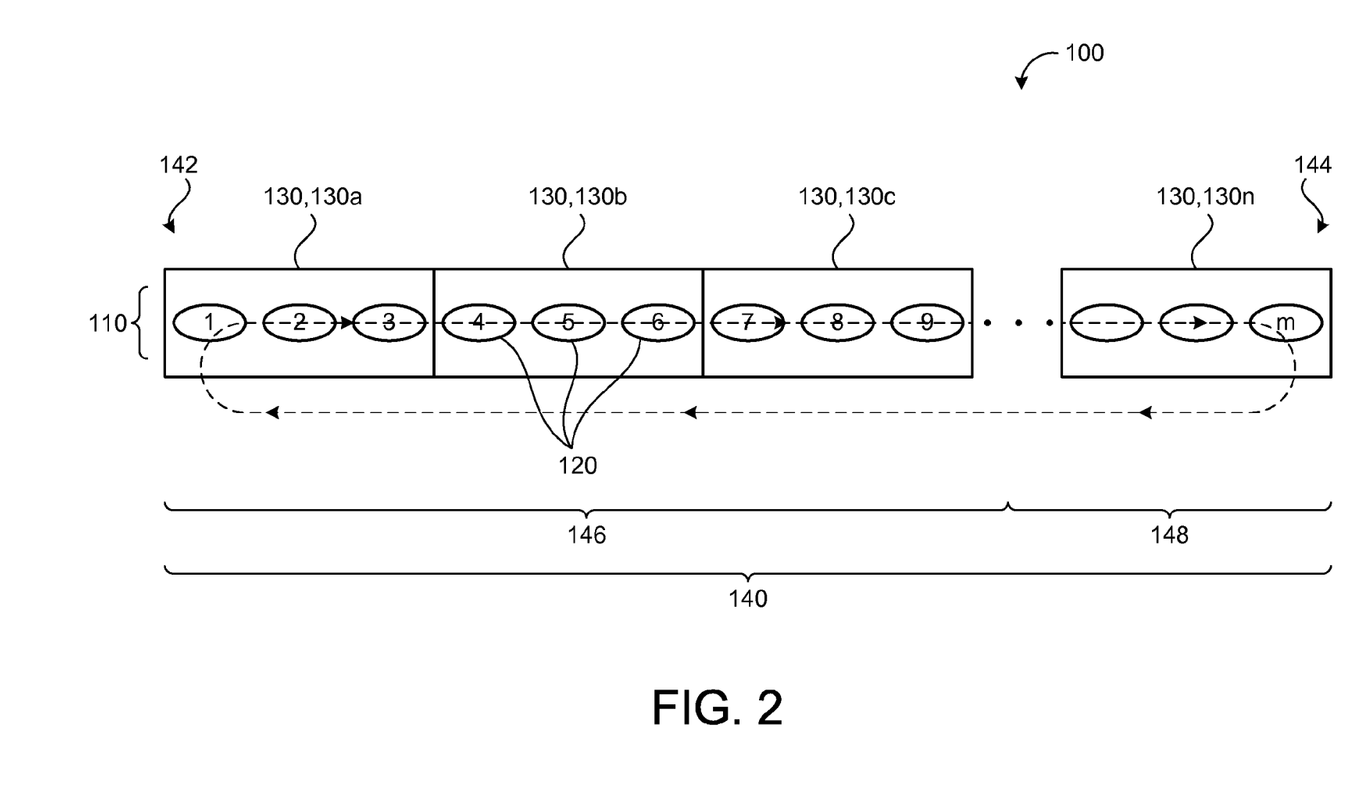
FIG. 2 is a schematic view an exemplary queue of memory blocks of a non-volatile computer-readable medium.

Referring to FIG. 2, in some implementations, the non-volatile computer-readable medium 100 includes an array 110 of memory cells 120 for receiving and storing data. Moreover, the memory cells 120 can be grouped in memory blocks 130. In the example shown, the memory cells 120 (numbered 1-m) and the memory blocks 130, 130a-n are arranged in consecutive order. A data writing restriction applied to the non-volatile computer-readable medium 100 may include erasing an entire memory block 130 of memory cells 120 before receiving any new data into one or more memory cells 120 of that respective memory block 130.

When using the non-volatile computer-readable medium 100 as the cache 20 to store recently accessed data from the data storage system 10, the cache 20 may implement a data eviction policy (e.g., executed on a processor associated with the cache 20) for determining when and what data is erased to free-up memory cells 120 and/or memory blocks 130 for receiving additional data after reaching capacity. Erasing an entire memory block 130, 130n may cause the erasure of some data recently accessed and/or accessed frequently. To access that data again, the data storage system 10 would need to read that data from the relatively slower disk drive(s) 32 or from another memory block 130, which previously received a copy of that data.

The executed data eviction policy may consider a frequency of usage of the stored data before evicting the data. For example, a number of times the data, a memory cell 120 and/or memory block 130 is accessed within a threshold period of time and/or a number of transactions (i.e., read, erase, and/or write) can be used to determine an access frequency for the associated data.

To increase data access efficiency of the data storage system 10, the data eviction policy may retain data having a relatively high access frequency in the cache 20 over other data having a relatively low access frequency. For example, when erasing memory (e.g., memory block(s) 130) to make memory available to receive data, the data eviction policy may cause the retention of some data having a relatively high access frequency by copying that data from one or more memory blocks 130 about to be erased to other memory blocks 130.

Figure 3:
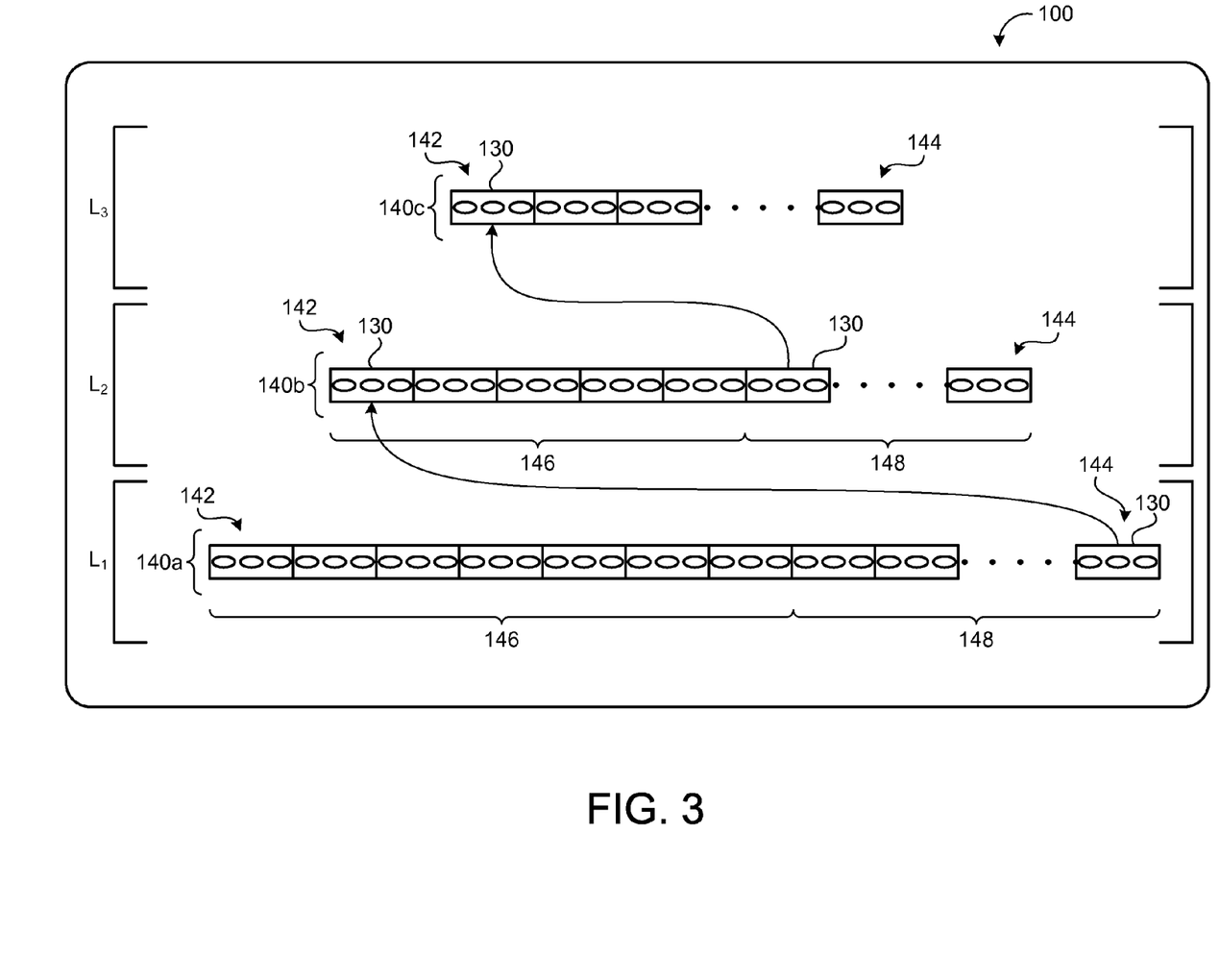
FIG. 3 is a schematic view an exemplary cache having queues of memory blocks arranged in successive levels.

Referring to FIGS. 2 and 3, in some implementations, the memory blocks 130 are arranged in multiple queues 140. Each queue 140 has a head 142, a tail 144, a leading portion 146 starting at the head 142, and a trailing portion 148 ending at the tail 144. The leading and trailing portions 146, 148 of the queue 140 may each have one or more memory blocks 130. In some examples, the leading and trailing queue portions 146, 148 are each sized to hold equal halves of the memory blocks 130 of the queue 140. In other examples, the leading queue portion 146 holds relatively more memory blocks 130 than the trailing queue portion 148, while in yet additional examples, the tailing queue portion 148 holds relatively more memory blocks 130 than the leading queue portion 146. The sizing of the leading and trailing queue portions 146, 148 can be optimized for efficient access in the cache 20 of frequently accessed data.

Each queue 140 receives data into a memory block 130 associated with the head 142 of that queue 140. The memory blocks 130 rotate from the head 142 of the queue 140 to the tail 144 of the queue 140 in successive order upon receiving data (e.g., writing data). Upon rotation or replacement from the tail 144 to the head 142 of the queue 140, the memory block 130 is erased so that it can receive data at the head 142 of the queue 140. As a result, data moves through the queue 140 (from the head 142 to the tail 144) with a first-in-first-out (FIFO) data eviction policy.

In the example shown, the non-volatile computer-readable medium 100 includes first, second, and third queues 140a, 140b, 140c; however other numbers of queues 140 are possible a well. The first queue 140a is shown larger than the second and third queues 140b, 140c, and the second queue 140b is shown larger than the third queue 140c (e.g., in a pyramidal structure). For example, the first queue 140a may hold between 50% and 90% of the memory blocks 130, the second queue may hold between 10% and 49% of the memory blocks 130, and the third queue 140c may hold between 1% and 40% of the memory blocks 130. Other arrangements and queue sizes are possible as well (e.g., queues of equal sizes, etc.).

Each queue 140 has an associated promotion level $L_N$ (e.g., $L_1, L_2, L_3$, etc.). Data from a queue 140 with a promotion level $L_N$ can be copied (or "promoted") to another queue 140 having a promotion level $L_{N+1}$. The promotion level $L_N$ may denote a hierarchy among the queues 140. For example, for first and second queues 140a, 140b having first and second promotion levels $L_1, L_2$, respectively, the second queue 140a has a higher promotion level than the first queue 140a. To increase data access efficiency, the cache 20 may promote data having a relatively high access frequency to a queue 140 having a promotion level $L_{N+1}$, e.g., to increase the pendency of that data in the cache 20. Therefore, data accessed relatively frequently may reside in queues 140 having relatively higher promotion levels $L_N$ with respect to other queues 140. For example, data residing in the second queue 140b, having a promotion level of $L_2$, has relatively greater usage than data residing in the first queue 140a, having a promotion level of $L_1$.

In some implementations, the cache 20 has an associated promotion policy (e.g., executed on a processor associated with the cache 20) for determining when the cache 20 promotes data. The promotion policy may include copying data accessed or selected in the trailing portion 148 of a first queue 140a having a promotion level $L_N$ to a memory block 130 associated with the head 142 of a second queue 140b having a promotional level $L_{N+1}$. Referring again to the example shown, to preserve frequently accessed or selected data in the cache 20, data accessed or selected in the trailing portion 148 of the first queue 140a, having promotion level $L_1$ is copied to a memory block 130 associated with the head 142 of the second queue 140b, having promotion level $L_2$. Similarly, data accessed in the trailing portion 148 of the second queue 140b, having promotion level $L_2$ is copied to a memory block 130 associated with the head 142 of the third queue 140c, having promotion level $L_3$.

Each queue 140 can rotate memory blocks 130 from its head 142 to its tail 144 at a circulation time (i.e., a rotation time) independent of the other queues 140. For example, the first queue 140a may have a relatively quick rotation time compared to the other queues 140b, 140c, since data accessed form the bank 30 of hard drives 32 is initially stored in the first queue 140a. If the data storage system 10 infrequently accesses data from the trailing portion 148 of the first queue 140a, then the second queue 140b would infrequently receive data.

Figure 4:
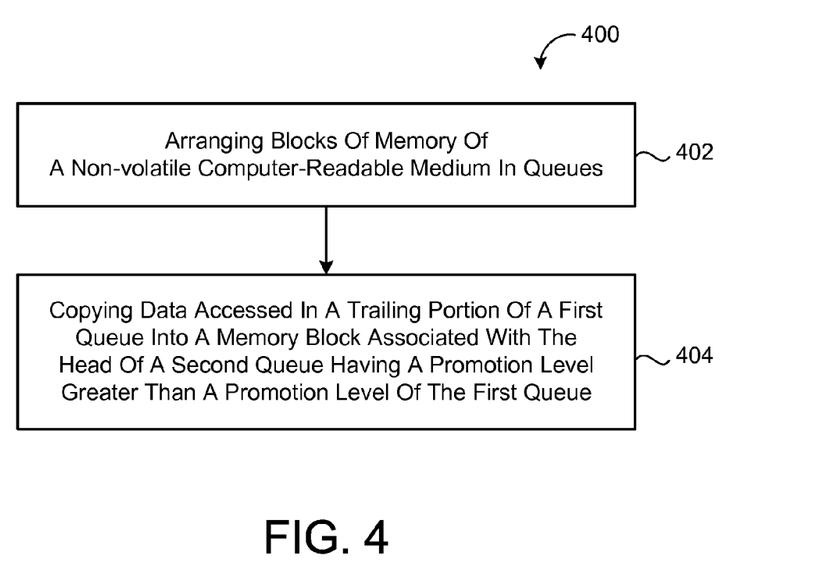
FIG. 4 is an exemplary arrangement of operations for a computer-implemented method of managing a non-volatile computer-readable medium.

FIG. 4 provides an exemplary arrangement 400 of operations for a computer-implemented method of managing the non-volatile computer-readable medium 100. The method includes arranging 402 blocks 130 of memory cells 120 of the non-volatile computer-readable medium 100 in queues 140. Each queue 140 has a promotion level $L_N$, a head 142, a tail 144, a leading portion 146 of memory blocks 130 starting at the head 142 of the queue 140, and a trailing portion 148 of memory blocks 130 ending at the tail 144 of the queue 140. Each queue 140 receives data into a memory block 130 associated with the head 142 of the queue 140 and the memory blocks 130 are rotated from the head 142 of the queue 140 to the tail 144 of the queue 140 in successive order upon receiving data with a first-in-first-out data eviction policy. The method also includes copying 404 data accessed or selected in a trailing portion 148 of a first queue 140a into a memory block 130 associated with the head 142 of a second queue 140b having a promotion level $L_{N+1}$ greater than a promotion level $L_N$ of the first queue 140a.

Figure 5:
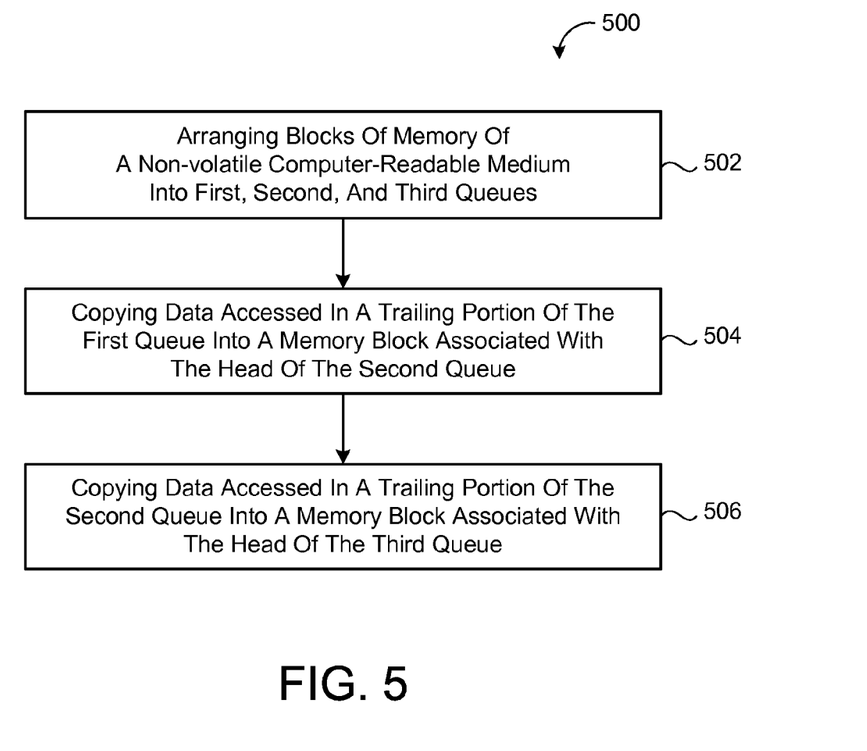
FIG. 5 is an exemplary arrangement of operations for a computer-implemented method of managing a non-volatile computer-readable medium.

FIG. 5 provides an exemplary arrangement 500 of operations for a computer-implemented method of managing the non-volatile computer-readable medium 100. The method includes arranging 502 the memory blocks 130 into first, second, and third queues 140a, 140b, 140c. The first queue 140a has a first promotion level $L_1$ and optionally sized larger than the second queue 140b. The second queue 140b has a second promotion level $L_2$, which is greater than the first promotion level $L_1$, and optionally sized larger than the third queue 140c. The third queue 140c has a third promotion level $L_3$, which is greater than the second promotion level $L_2$. The method further includes copying 504 data accessed or selected in a trailing portion 148 of the first queue 140a into a memory block 130 associated with the head 142 of the second queue 140b, and copying 506 data accessed or selected in a trailing portion 148 of the second queue 140b into a memory block 130 associated with the head 142 of the third queue 140c. Once in the third queue 140c, the data may move through that queue 140c on a first-in-first-out (FIFO) basis.

In some implementations, the method includes copying data accessed in a trailing portion 148 of the third queue 140c (or a queue 140 having a top promotion level $L_{Max}$) into a memory block 130 associated with the head 142 of that queue 140, 140c.

In additional implementations, the method may include assessing an access frequency of data stored in a memory block 130 at the tail 144 of the third queue 140c, or in other examples, a queue 140 having a top promotion level $L_{Max}$ and copying data having threshold access frequency from the memory block 130 at the tail 144 of the queue 140, 140c to a memory block 130 at the head 142 of that queue 140, 140c. Assessing an access frequency may include counting a number of data reads of that data within a threshold period of time or threshold number of cache reads, determining a period of time between data reads. The memory blocks 130 may have attributed metadata, providing an associated access frequency, circulation time within the queue 140, circulation count and/or other information.

The method may include dynamically altering a number of queues 140 and/or a size of each queue 140 based on usage, cache size, circulation time, and/or promotion usage. This may allow for efficient use of the cache 20 to facilitate access to frequently accessed data. For example, a cache 20 having seven queues 140 with seven corresponding promotion levels $L_{N:1-7}$ may experience periods of time when the top two queues 140 having promotion levels $L_6$ and $L_7$ receive data relatively infrequently. To allow for relatively larger queues 140 having lower portion levels $L_{N:1-5}$, the two queues 140 having promotion levels $L_6$ and $L_7$ may be temporarily or permanently removed and the corresponding memory blocks 130 reallocated to the other queues 140. In addition or alternatively, memory blocks 130 can be reallocated between queues 140, altering the sizes of those queues 140 to accommodate usage levels.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus" and "computing processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A computer-implemented method comprising:
    arranging blocks of memory of a non-volatile computer-readable medium in queues, each queue having a promotion level, a head, a tail, a leading portion of memory blocks starting at the head of the queue and a trailing portion of memory blocks ending at the tail of the queue, each queue receiving data into a memory block associated with the head of the queue, the memory blocks being rotated from the head of the queue to the tail of the queue in successive order upon receiving data with first-in-first-out data eviction;
    arranging the queues in a hierarchy based on their promotion levels, starting with a bottom promotion level up to a top promotion level, the hierarchy of queues receiving data first in the head of a queue having the bottom promotion level; and
    copying data accessed in a trailing portion of a first queue into a memory block associated with the head of a second queue, the second queue having one promotion level greater than a promotion level of the first queue in the hierarchy of queues, when the data has an access frequency greater than a threshold access frequency.

2. The method of claim 1, further comprising copying data accessed in a trailing portion of a queue having the top promotion level into a memory block associated with the head of that queue.

3. The method of claim 1, further comprising:
    assessing an access frequency of data stored in a memory block at the tail of a queue having the top promotion level; and
    copying data having a threshold access frequency from the memory block at the tail of the queue to a memory block at the head of that queue.

4. The method of claim 3, wherein assessing an access frequency comprises counting a number of data reads within a threshold period of time.

5. The method of claim 3, wherein assessing an access frequency comprises determining a period of time between data reads.

6. The method of claim 1, further comprising altering a number of queues based on queue usage.

7. The method of claim 1, further comprising rearranging memory blocks among the queues, altering sizes of the queues, based on respective queue usage.

8. The method of claim 1, further comprising:
    arranging the blocks of memory into first, second, and third queues, the first queue having a corresponding first promotion level, the second queue having a corresponding second promotion level greater than the first promotion level, the third queue having a corresponding third promotion level greater than the second promotion level;
    copying data accessed in a trailing portion of the first queue into a memory block associated with the head of the second queue; and copying data accessed in a trailing portion of the second queue into a memory block associated with the head of the third queue.

9. The method of claim 8, further comprising:
sizing the first queue larger than the second queue; and
sizing the second queue larger than the third queue.

10. The method of claim 8, further comprising copying data accessed in a trailing portion of the third queue into a memory block associated with the head of the third queue.

11. A non-transitory computer-readable medium that stores instructions executable by one or more computing processors to perform a method for managing a non-volatile computer-readable medium, the method comprising:
arranging blocks of memory of a non-volatile computer-readable medium in queues, each queue having a promotion level, a head, a tail, a leading portion of memory blocks starting at the head of the queue and a trailing portion of memory blocks ending at the tail of the queue, each queue receiving data into a memory block associated with the head of the queue, the memory blocks being rotated from the head of the queue to the tail of the queue in successive order upon receiving data with first-in-first-out data eviction;
arranging the queues in a hierarchy based on their promotion levels, starting with a bottom promotion level up to a top promotion level, the hierarchy of queues receiving data first in the head of a queue having the bottom promotion level; and
copying data accessed in a trailing portion of a first queue into a memory block associated with the head of a second queue, the second queue having one promotion level greater than a promotion level of the first queue in the hierarchy of queues when the data has an access frequency greater than a threshold access frequency.

12. The method of claim 11, further comprising copying data accessed in a trailing portion of a queue having the top promotion level into a memory block associated with the head of that queue.

13. The method of claim 11, further comprising:
assessing an access frequency of data stored in a memory block at the tail of a queue having the top promotion level; and
copying data having a threshold access frequency from the memory block at the tail of the queue to a memory block at the head of that queue.

14. The method of claim 13, wherein assessing an access frequency comprises counting a number of data reads within a threshold period of time.

15. The method of claim 13, wherein assessing an access frequency comprises determining a period of time between data reads.

16. The method of claim 11, further comprising altering a number of queues based on queue usage.

17. The method of claim 11, further comprising rearranging memory blocks among the queues, altering sizes of the queues, based on respective queue usage.

18. The method of claim 11, further comprising:
arranging the blocks of memory into first, second, and third queues, the first queue having a corresponding first promotion level, the second queue having a corresponding second promotion level greater than the first promotion level, the third queue having a corresponding third promotion level greater than the second promotion level;
copying data accessed in a trailing portion of the first queue into a memory block associated with the head of the second queue; and
copying data accessed in a trailing portion of the second queue into a memory block associated with the head of the third queue.

19. The method of claim 18, further comprising:
sizing the first queue larger than the second queue; and
sizing the second queue larger than the third queue.

20. The method of claim 18, further comprising copying data accessed in a trailing portion of the third queue into a memory block associated with the head of the third queue.

21. A non-transitory non-volatile computer-readable medium that stores instructions executable by one or more computing processors, the non-volatile computer-readable medium comprising:
blocks of memory arranged in queues having associated promotion levels, each queue having a promotion level, a head, a tail, a leading portion of memory blocks starting at the head of the queue and a trailing portion of memory blocks ending at the tail of the queue, each queue receiving data into a memory block associated with the head of the queue, the memory blocks being rotated from the head of the queue to the tail of the queue in successive order upon receiving data with first-in-first-out data eviction, the queues arranged in a hierarchy based on their promotion levels, starting with a bottom promotion level up to a top promotion level, the hierarchy of queues receiving data first in the head of a queue having the bottom promotion level;
wherein data accessed in a trailing portion of a first queue is copied into a memory block associated with the head of a second queue, the second queue having one promotion level greater than a promotion level of the first queue in the hierarchy of queues when the data has an access frequency greater than a threshold access frequency.

22. The non-transitory non-volatile computer-readable medium of claim 21, wherein data accessed in a trailing portion of a queue having the top promotion level is copied into a memory block associated with the head of that queue.

23. The non-transitory non-volatile computer-readable medium of claim 21, wherein data having a threshold access frequency and in a memory block at the tail of a queue having the top promotion level is copied from that tail memory block to a memory block at the head of that queue.

24. The non-transitory non-volatile computer-readable medium of claim 23, wherein the access frequency comprises a number of data reads within a threshold period of time.

25. The non-transitory non-volatile computer-readable medium of claim 23, wherein the access frequency comprises a period of time between data reads.

26. The non-transitory non-volatile computer-readable medium of claim 21, wherein the number of arranged queues is based on queue usage.

27. The non-transitory non-volatile computer-readable medium of claim 21, wherein the memory blocks are rearranged among the queues, altering sizes of the queues, based on respective queue usage.

28. The non-transitory non-volatile computer-readable medium of claim 21, wherein the blocks of memory are arranged into first, second, and third queues, the first queue having a corresponding first promotion level, the second queue having a corresponding second promotion level greater than the first promotion level, the third queue having a corresponding third promotion level greater than the second promotion level, data accessed in a trailing portion of the first queue is copied into a memory block associated with the head of the second queue, and data accessed in a trailing portion of the second queue is copied into a memory block associated with the head of the third queue.

29. The non-transitory non-volatile computer-readable medium of claim 28, wherein the first queue is larger than the second queue and the second queue is larger than the third queue.

30. The non-transitory non-volatile computer-readable medium of claim 28, wherein data accessed in a trailing portion of the third queue is copied into a memory block associated with the head of the third queue.

* * * * *